US008515878B2

(12) United States Patent
Radloff et al.

(10) Patent No.: US 8,515,878 B2
(45) Date of Patent: Aug. 20, 2013

(54) ENERGY CONSUMPTION MANAGEMENT

(76) Inventors: Frans Gustav Theodor Radloff, Pretoria (ZA); Louis Johannes Grobler, Potchefstroom (ZA)

( * ) Notice: Subject to any disclaimer, the term of this patent is extended or adjusted under 35 U.S.C. 154(b) by 40 days.

(21) Appl. No.: 12/918,501

(22) PCT Filed: Feb. 20, 2009

(86) PCT No.: PCT/IB2009/050709
§ 371 (c)(1),
(2), (4) Date: Nov. 9, 2010

(87) PCT Pub. No.: WO2009/104164
PCT Pub. Date: Aug. 27, 2009

(65) Prior Publication Data
US 2011/0289019 A1    Nov. 24, 2011

(30) Foreign Application Priority Data

Feb. 20, 2008  (ZA) .................................. 2008/01656

(51) Int. Cl.
*G06F 17/00* (2006.01)
(52) U.S. Cl.
USPC ........................................................ 705/412
(58) Field of Classification Search
USPC ............... 705/412, 400, 348, 1.1, 7.11–7.39,
705/14.1–14.14, 14.19–14.25, 14.39, 14.73,
705/22, 26.1–36 R, 37, 39–41; 700/286–298
See application file for complete search history.

(56) References Cited

U.S. PATENT DOCUMENTS

| | | |
|---|---|---|
| 2004/0225648 A1 | 11/2004 | Ransom et al. |
| 2005/0033707 A1* | 2/2005 | Ehlers et al. ................... 705/412 |
| 2006/0031180 A1 | 2/2006 | Tamarkin et al. |
| 2007/0143045 A1 | 6/2007 | MacGregor |
| 2007/0143046 A1 | 6/2007 | Budike, Jr. |
| 2007/0203860 A1 | 8/2007 | Golden et al. |
| 2009/0083215 A1* | 3/2009 | Burger ............................ 707/2 |

OTHER PUBLICATIONS

International Search Report and Written Opinion of the International Searching Authority mailed Sep. 25, 2009 in International Patent Application No. PCT/IB2009/050709.

* cited by examiner

*Primary Examiner* — Igor Borissov
(74) *Attorney, Agent, or Firm* — Barnes & Thornburg LLP

(57) ABSTRACT

An energy consumption display arrangement, which includes a database in which is stored incident energy consumption data of a number of energy consumption sites stored over a period of time, a graphical user interface operable to retrieve selected consumption data of at least one energy consumption site from the database and to present said selected consumption data to a user, the graphical user interface having a user definable dashboard for displaying any one or more of incident power consumption-, accumulated daily power consumption- and accumulated monthly power consumption of the at least one energy consumption site.

2 Claims, 17 Drawing Sheets

142

Bill
Period Start: 2008-12-01     —144
Period End: 2008-12-08     —146

Bills:

148    150      152

EC Pretoria Office's Bill From 2008-12-01 to 2008-12-08

Consumption Details

| | |
|---|---|
| Energy Consumption Off Peak kWh | 547 |
| Energy Consumption STD kWh | 0 |
| Energy Consumption Peak kWh | 0 |
| Energy Consumption All kWh | 547 |
| Demand Consumption Off Peak | 46 |
| Demand Consumption STD | 0 |
| Demand Consumption Peak | 0 |
| Demand Reading KW/kVA | 0 |
| Load factor | 4.81 |

Tariff Name: Tshwane Non Domestic Three Phase (Conventional)

| | | |
|---|---|---|
| Fixed Demand Charge | | R254.13 |
| Energy Charge | 547kWh | R212.13 |
| Total Charges | 150 | R466.26 |

[ Export Bill to PDF ]

Power Conservation Programme (PCP)

What Information do you have?

312  314

Enter Amount:  R  316

318 Mining
320 Agriculture
322 Industry
324 Commercial           Your Load:
326 Residential        ○ < 10MVA  ○ > 10MVA
328 Government/State owned  330      332
    enterprise Rand per kWh:  0.45  334
Projected use:       336  %
                  Submit

Fig. 20

Page View Count

| | 402 | 404 | 406 | 408 |
|---|---|---|---|---|
| Home | 22113 | 1602 | 49 | |
| Current Dial Graphs | 7065 | 1248 | 83 | |
| PowerWatches | 2431 | 1165 | 129 | |
| Graphs | 2167 | 886 | 22 | |
| Administration Page | 1441 | 198 | 20 | |
| Welcome Page | 1037 | 305 | 15 | |
| Location Map | 549 | 58 | 9 | |
| Overview | 430 | 87 | 1 | |
| Bill | 360 | 188 | 6 | |
| Data Export | 317 | 182 | 2 | |
| Savings | 302 | 119 | 6 | |
| Rankings | 295 | 114 | 5 | |
| Location Tree | 290 | 187 | 3 | |
| Environmental Impact | 275 | 97 | 8 | |
| Month Dial Graph | 163 | 67 | 1 | |
| Reporting V2 | 161 | 148 | 9 | |
| Reports | 136 | 24 | 0 | |
| Day Dial Graph | 121 | 56 | 1 | |
| Tips and Tricks | 83 | 22 | 0 | |
| Downloads | 39 | 3 | 0 | |
| About | 19 | 2 | 0 | |
| Contact Us | 12 | 0 | 0 | |

ENERGY CONSUMPTION MANAGEMENT

CROSS-REFERENCE TO RELATED APPLICATIONS

The present application claims the benefit of priority to International Patent Application No. PCT/IB2009/050709 filed 20 Feb. 2009, which further claims the benefit of priority to South African Patent Application No. 2008/01656 filed 20 Feb. 2008, the contents of which are incorporated herein by reference in their entirety.

This invention relates to energy consumption management. In particular the invention relates to an energy consumption display arrangement and a method of monitoring energy consumption.

BACKGROUND OF THE INVENTION

The inventor is aware of personal computer based energy management systems that collect information from meter and displays the information collected from the meters to the user. Some of these systems also calculate the electricity bill based on the meter information and an applicable electricity tariff. Some of these systems allow the user to view graphs/charts or load profiles collected from the meter. None of the systems known to the inventor displays this data in the format described below. None of the systems known to the inventor takes action to notify users of certain conditions. None of the systems known to the inventor broadcasts the state of the electricity consumption at a particular site to interested users

SUMMARY OF THE INVENTION

According to one aspect of the invention, there is provided an energy consumption display arrangement, which includes
   a database in which is stored incident energy consumption data of a number of energy consumption sites stored over a period of time;
   a graphical user interface operable to retrieve selected consumption data of at least one energy consumption site from the database and to present said selected consumption data to a user, the graphical user interface having a user definable dashboard for displaying any one or more of incident power consumption-, accumulated daily power consumption- and accumulated monthly power consumption of the at least one energy consumption site.

The energy consumption display arrangement may include access means for controlling access to the database, the access means being in the form of a login screen of the graphical user interface. The access means may be in the form of a username and password combination issued to an authorized user, which, if used in the correct combination, provides access to the database.

The user definable dashboard may include a composite dial for displaying on three scales all three of the incident power consumption-, accumulated daily power consumption- and accumulated monthly power consumption of the at least one energy consumption site. For example, the composite dial may include three watch-type hand for indicating incident power consumption-, accumulated daily power consumption- and accumulated monthly power consumption respectively.

The composite dial may include pre-defined consumption zones over the respective display ranges of the incident power consumption-, accumulated daily power consumption- and accumulated monthly power consumption scales. For example, the consumption zones may include a green zone indicating power consumption which is less that a pre-defined consumption target, a yellow zone indicating power consumption exceeding the consumption target, but not-exceeding a percentage between the target and a consumption baseline, an orange zone indicating power consumption exceeding a consumption target, and exceeding the percentage between the target and the consumption baseline, and a red zone indicating power consumption exceeding a pre-defined consumption baseline.

The composite dial may provide pop-up display zones on each of the display scales, the pop-up display zones operable to display detailed historic power consumption graphs for each of the respective display scales.

The pop-up display zone in the incident power consumption scale may display at least one of an energy demand profile for the day, the accumulated power consumption for the day, an energy demand profile for the present month, and an accumulated power consumption for the month.

The pop-up display zone in the accumulated daily power consumption zone may display an accumulated daily power consumption graph in combination with a baseline daily power consumption graph and a daily target power consumption graph.

The pop-up display zone in the accumulated monthly power consumption scale may display an accumulated monthly power consumption graph in combination with a baseline monthly power consumption graph and a monthly target power consumption graph.

The energy consumption display arrangement may include display buttons for displaying for at least one energy consumption site any one or more of consumption graphs, consumption savings graphs, billing information, consumption savings rankings, detailed reports, consumption overview graphs, a map display of consumption, an environmental impact of consumption, a consumption data export menu, a power conservation programme calculation page, a consumption composition tree, referred to as a location tree, and a database statistics/administration page.

The consumption graphs button may be operable to display any one of a demand profile and a consumption profile for a selected consumption site over a selected period of time. A data button may display the data in tabular format instead of plotting a graph. This may be sometimes useful to extract specific data points from the data.

The consumption savings graphs button may be operable to display a consumption baseline, a consumption target, a current consumption and a consumption saving for any one of the present month, for a particular consumption price, for a planned annual saving, and for a planned monthly saving.

The billing information button may be operable to display a billing calculation for a particular period based on a particular consumption pricing-model.

The consumption savings rankings button may be operable to display a savings ranking for a selected number of consumption sites.

The detailed reports button may be operable to display for a selected consumption site any one of a number of reports selected from an environmental impact report, a monthly savings graph, a profile graph a savings graph and a total consumption graph.

The consumption overview graphs button may be operable to display a combined consumption composition graph for a selected number of consumption sites.

The a map display of consumption button may be operable to display consumption icons arranged on a map, the consumption icons operable to display colours representative of predefined consumption zones.

The environmental impact of consumption button may be operable to display the environmental impact of consumption of a selected consumption site in terms of any one or more of $CO_2$—, $SO_X$—, and $NO_X$ emissions, water usage, ash generation and particulate emissions.

The consumption data export button may be operable to export consumption data of a selected consumption site to a data file.

The power conservation programme calculation button may be operable to calculate an energy consumption price based on the consumption and a particular consumption pricing-model.

The consumption composition tree, referred to as a location tree, may be operable to define and display the composition of consumption sites and consumption sub-sites.

The database statistics/administration page may be operable to display database access statistics.

According to another aspect of the invention, there is provided an energy consumption display arrangement, which includes
a database in which is stored incident energy consumption data of a number of energy consumption sites stored over a period of time;
a graphical user interface operable to retrieve selected consumption data of at least one energy consumption site from the database and to present said selected consumption data to a user, the graphical user interface being in the form of a computer icon in which the colour of the computer icon is representative of the desired energy consumption saving, for example a green icon indicates a positive energy consumption saving and a red icon indicates a negative energy consumption saving, i.e. an energy consumption wastage.

According to yet another aspect of the invention, there is provided a method of monitoring energy consumption, which includes
measuring energy consumption of at least one energy consumption site;
storing energy consumption data of the at least one energy consumption site on a database; and
presenting selected energy consumption data to the at least one energy consumption site by means of a graphical user interface.

The method may include setting at least one energy consumption saving target for the at least one energy consumption site.

The at least one energy consumption saving target may be any one of a self-imposed target and an enforced energy consumption saving target.

The energy consumption saving target may be matched to a particular energy consumption profile. For example the energy consumption target may be matched to an energy consumption profile for a particular day of the week, -week or -month.

The method may include determining an energy consumption baseline for the at least one user. For example, the energy consumption baseline may provide an indication of historic energy consumption.

The energy consumption baseline may be matched to a particular energy consumption profile. For example the historic energy consumption baseline may be matched to an energy consumption profile for a particular day of the week, -week or -month.

The selected energy consumption data may be presented as a consumption graph over a selected period of time. The energy consumption saving target may be superimposed over the energy consumption graph for a selected period of time.

The energy consumption baseline may be superimposed over the energy consumption graph for a selected period of time.

Presenting selected energy consumption data to the at least one energy consumer by means of a graphical user interface may include presenting a saving indication to a user via a computer icon on a computer desktop.

The colour of the computer icon may be representative of an energy consumption, for example a green icon may indicate an energy consumption saving and a red icon may indicate an energy consumption wastage.

Presenting selected energy consumption data to the at least one energy consumption site by means of a graphical user interface may include presenting selected energy consumption data in the form of a user definable computer dashboard for displaying any one or more of incident power consumption-, accumulated daily power consumption- and accumulated monthly power consumption of the at least one energy consumption site.

The dashboard may include a composite dial for displaying simultaneously the incident power consumption-, accumulated daily power consumption- and accumulated monthly power consumption of the at least one energy consumption site.

The method may include controlling access to the database by means of user verification, such as by means of a username and password combination to be entered in a login screen.

The energy consumption of the at least one energy consumption site may be presented as an environmental impact in terms of any one or more of $CO_2$—, $SO_X$—, and $NO_X$ emissions, water usage, ash generation, or the like.

The energy consumption of the at least one energy consumption site may be presented as a map display, operable to display consumption icons arranged on a map, the consumption icons operable to display colours representative of energy consumption per energy consumption site.

The method may include calculating an energy consumption price based on a particular consumption pricing-model.

Presenting selected energy consumption data to the at least one energy consumption site may include selectively accumulating energy consumption of more than one energy consumption site and presenting accumulated energy consumption data by means of the graphical user interface.

The invention extends to an energy consumption controller, which includes an energy consumption display arrangement as described.

The invention will now be described, by way of example only with reference to the following drawing(s):

DRAWING(S)

In the drawing(s):
FIG. 1 shows an Energy consumption display arrangement, in accordance with the invention;
FIG. 2 shows access means of the energy consumption display arrangement of FIG. 1;
FIG. 3 shows a display screen that includes a dashboard of the energy consumption display arrangement of FIG. 1;
FIG. 4 shows a dial of the dashboard of FIG. 3;
FIG. 5 shows a pop-up screen of an energy demand profile for a day;
FIG. 6 shows a pop-up screen of accumulated power consumption for a day;
FIG. 7 shows a pop-up screen of an energy demand profile for a present month;
FIG. 8 shows a pop-up screen of accumulated power consumption for a month;

FIG. 13 shows selected energy consumption billing data;

FIG. 20 shows a power conservation programme calculator;

FIGS. 22 and 23 show database administration and management tables; and

EMBODIMENT OF THE INVENTION

Figure 1:
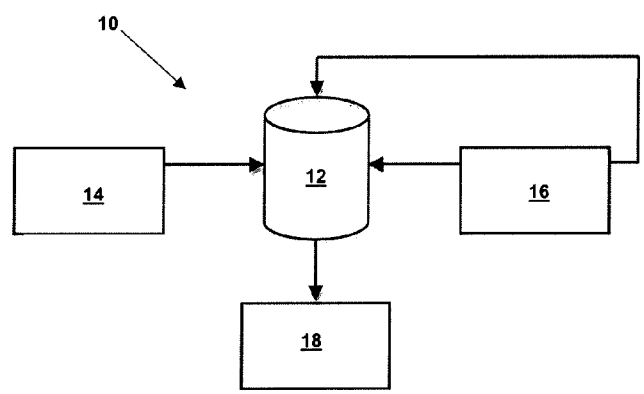

In FIG. 1 an energy consumption display arrangement 10 includes a database 12 in which is stored incident energy consumption data of a number of energy consumption sites (not shown) stored over a period of time and which have been collected from a metering interface 14.

The energy consumption display arrangement 10 further includes a so-called data engine/processor 16, which processes the measured energy consumption collected via the metering interface 14.

The energy consumption display arrangement 10 further includes a graphical user interface 18 which is operable to retrieve selected consumption data of at least one energy consumption site from the database 12 and to present said selected consumption data to a user.

Typically the graphical user interface 18 is in the form of a web portal operable to host remote computer terminals via an Internet website-based interface, such as a Hyper Text Markup Language (HTML) interface. Remote computers may thus connect to the graphical user interface 18 remotely, thereby to access the database 12.

Figure 2:

FIG. 2 shows access means 20 of the energy consumption display arrangement of FIG. 1 as being presented by the graphical user interface 18. The access means 20 is presented in the form of a login screen on a computer providing a username data field 22 and a password data field 24. The access means is operable, when a prior issued and authorized username and password are completed in the username data field 22 and the password data field 24, respectively, to permit access to a user to access the database 12.

Figure 3:
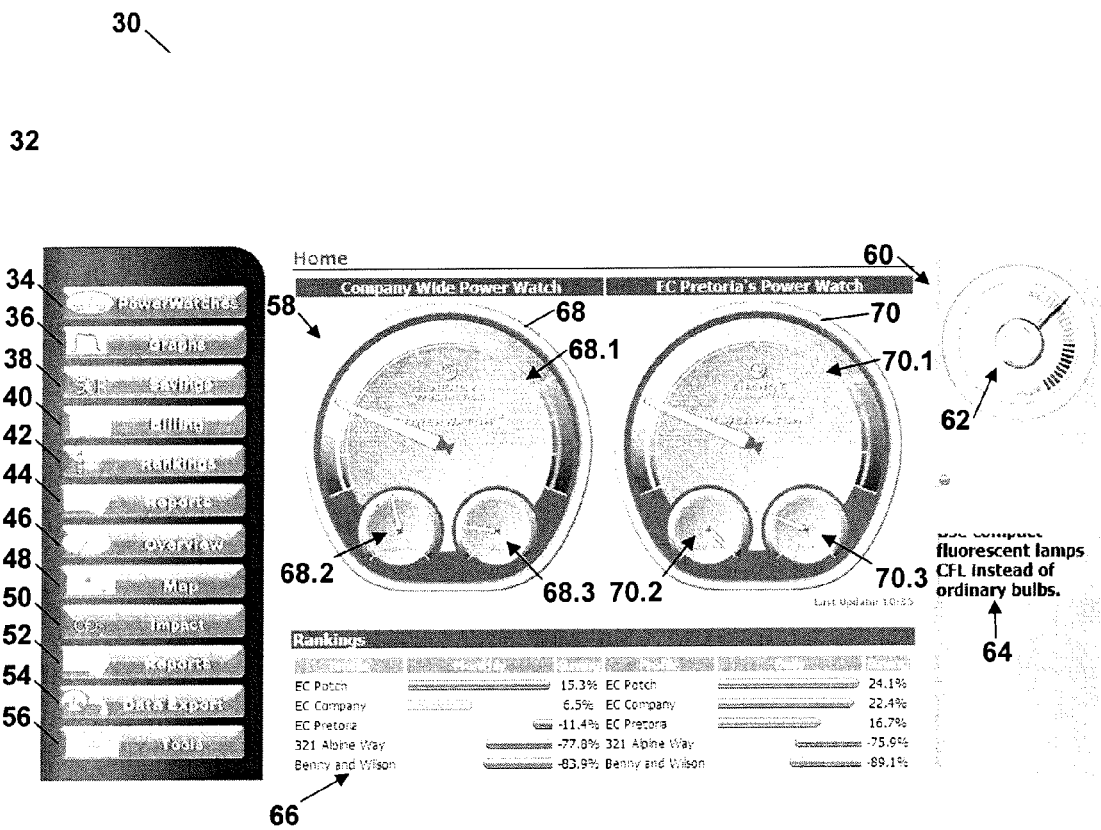

In FIG. 3 a screen 30 includes a dashboard 58 of the energy consumption display arrangement of FIG. 1. The dashboard 58 is user definable to display any one or more of incident power consumption-, accumulated daily power consumption- and accumulated monthly power consumption of one or more energy consumption sites.

A menu bar 32 on the left hand side of the screen 30 provides menu buttons for displaying the dashboard/power watches 34, consumption graphs 36, consumption savings graphs 38, billing information 40, consumption savings rankings 42, detailed reports 44, consumption overview graphs 46, a map display of consumption 48, an environmental impact of consumption 50, a consumption data export menu 54, and a tools menu 56 for displaying a power conservation programme calculation page, a consumption composition tree, and a database statistics/administration page.

On a right hand side of the screen 30 a menu bar 60 includes a dial 62 to display a national energy consumption. The menu bar 60 also includes a notification data field 64 and a news feed 66 of power saving suggestions.

At the bottom of the screen a display zone 66 displays power saving data from a number of energy consumption sites.

The dashboard 58 includes two dial-type indicators 68, 70 each having a main display 68.1, 70.1 showing incident energy consumption of an energy consumption site and two secondary dial-type indicators 68.2, 68.3 and 70.2, 70.3 showing running averages for monthly- and daily energy consumption for two energy consumption sites.

Figure 4:
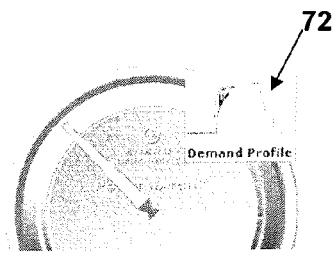
Figure 5:
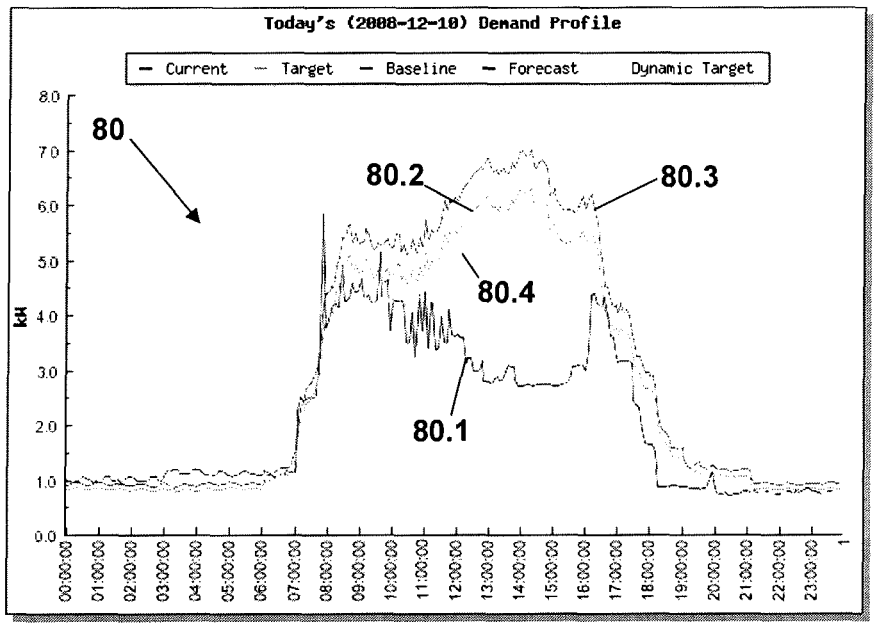

When a user hovers a one of the dials 68, 70 with a mouse pointer, a pop-up image appears 72, see FIG. 4. When the pop-up image is selected by a click of the mouse, the graphs shown in FIGS. 5 to 8 is shown. In FIG. 5 a daily demand graph 80 is shown over the period of one day. A current demand graph 80.1, a target demand graph 80.2, a baseline demand 80.3 and a dynamic demand graph 80.4 are plotted on the graph 80.

Figure 6:
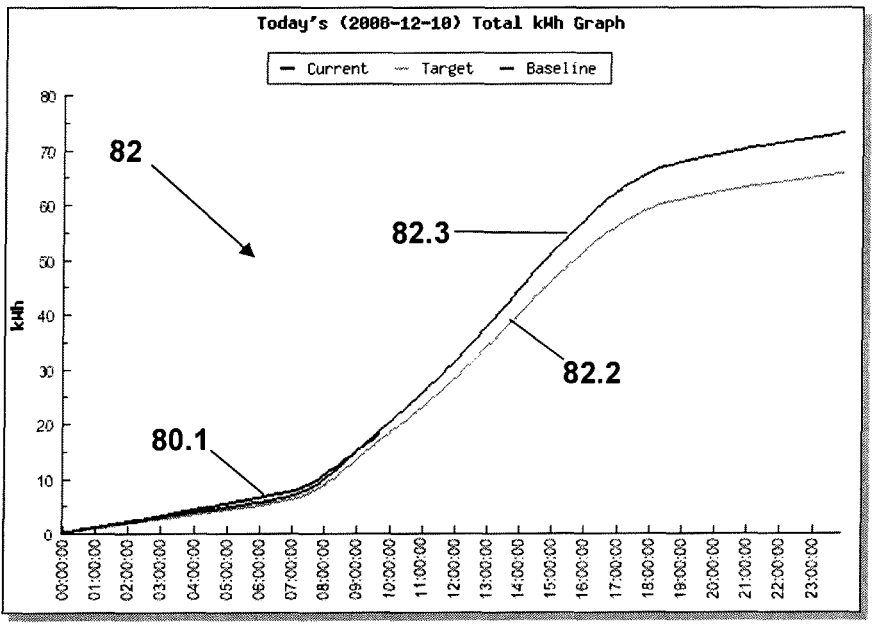

In FIG. 6, a daily consumption graph 82 is shown with a current consumption 82.1, a target consumption 82.2 and a baseline consumption 82.3 plotted on one graph.

Figure 7:
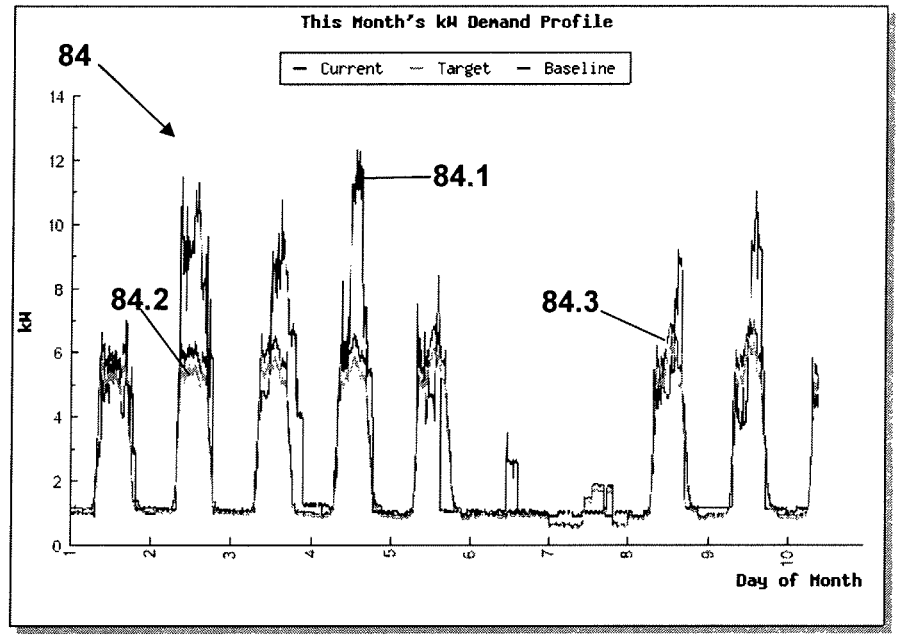

In FIG. 7, a monthly demand graph 84 is shown with a current demand, a target demand 84.2 and a baseline demand 84.3 plotted on one graph.

Figure 8:
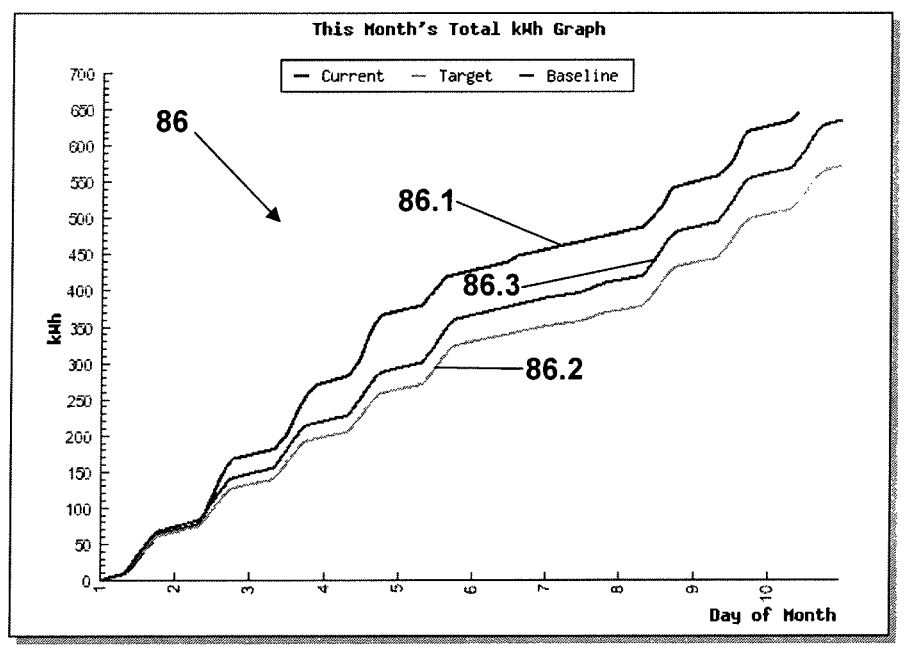

In FIG. 8, a monthly consumption graph 86 is shown with a current consumption 86.1, a target consumption 86.2 and a baseline consumption 86.3 plotted on one graph.

Figure 9:
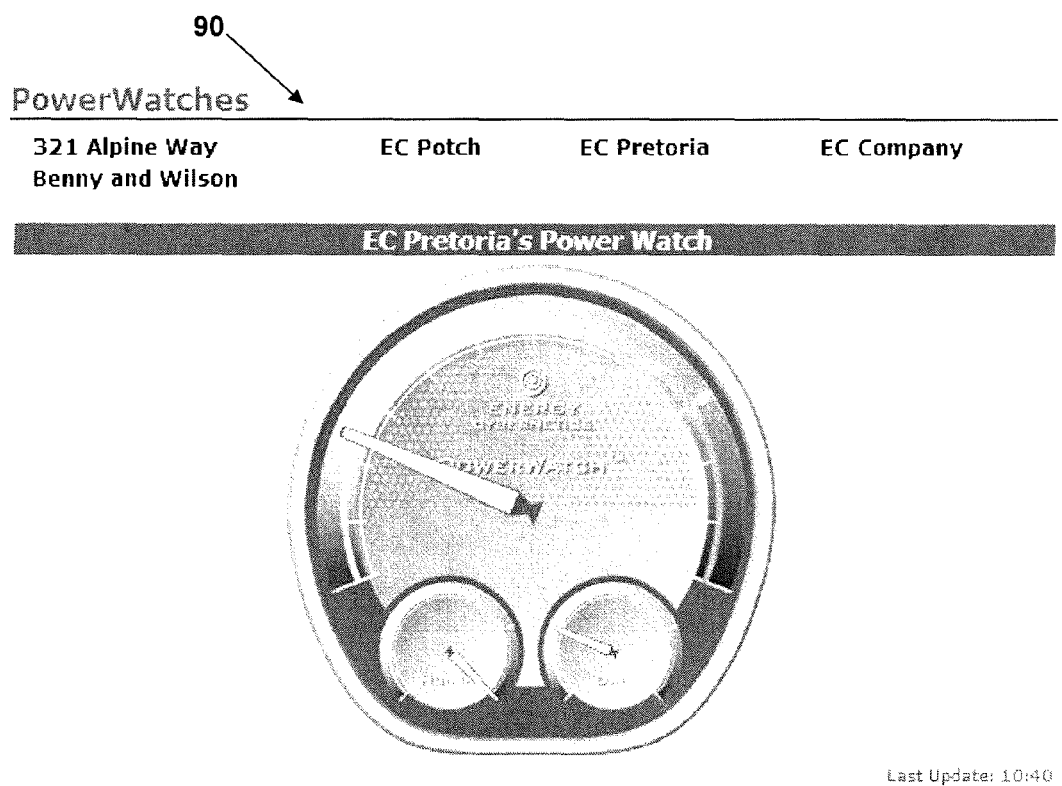
FIG. 9 shows a composite dial of a dashboard of the energy consumption display arrangement of FIG. 1.

In FIG. 9 a detailed dashboard 90 is shown when the power watches button 34 in FIG. 3 is selected.

Figure 10:
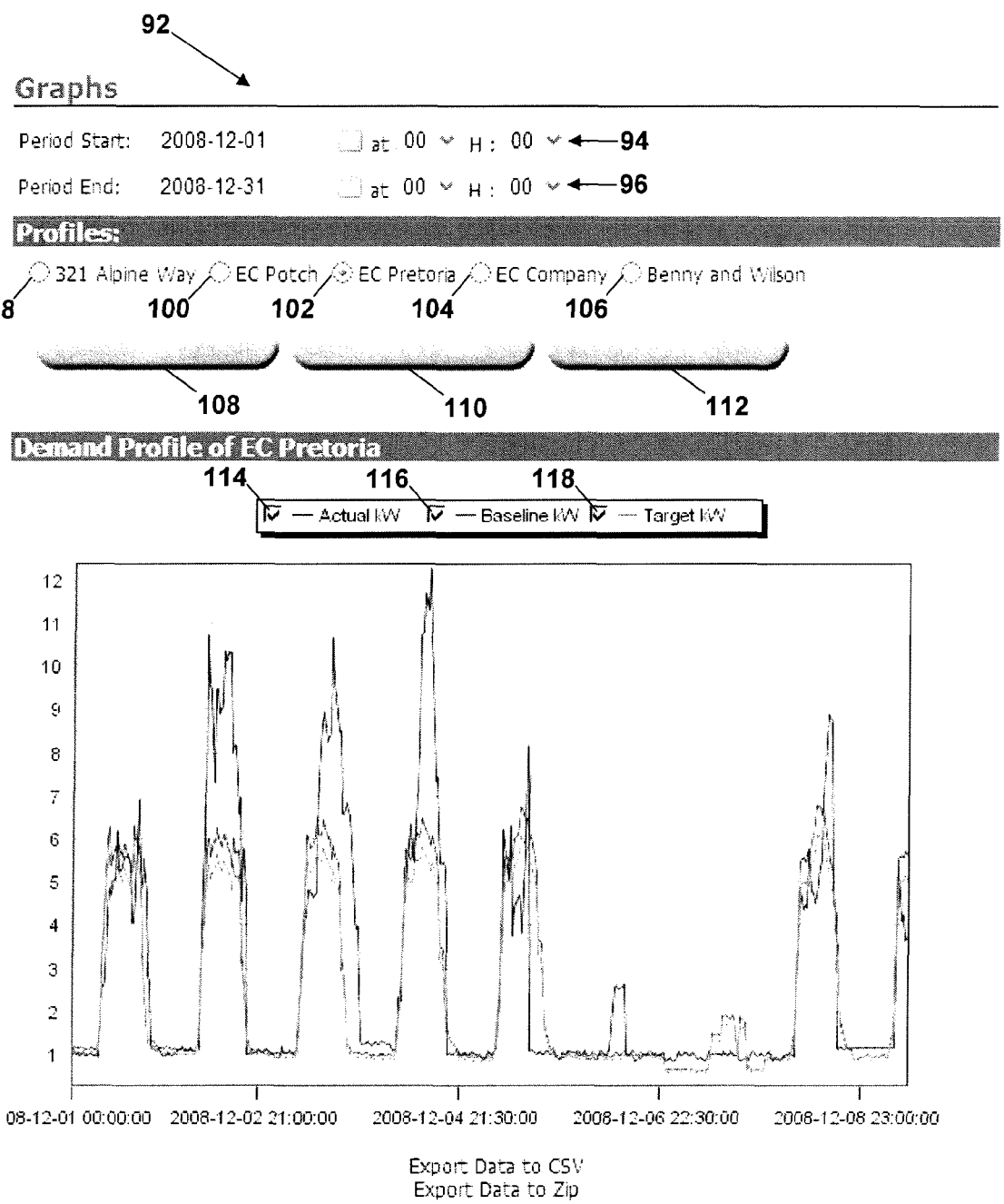
FIG. 10 shows a graphical representation of selected energy demand data.

In FIG. 10 a graph screen 92 is shown when the graphs button 36 in FIG. 3 is selected. The starting point of the graph can be selected at 94 and the ending point of the graph can be selected at 96. An energy consumption site can be selected by selecting a button 98, 100, 102, 104 or 106. Furthermore three types of graphs can be selected from a Data button 108, a demand profile button 110 and a total consumption button 112. Display of the actual consumption, a baseline consumption and a target consumption can be selected by selecting options 114, 116 or 118.

Figure 11:
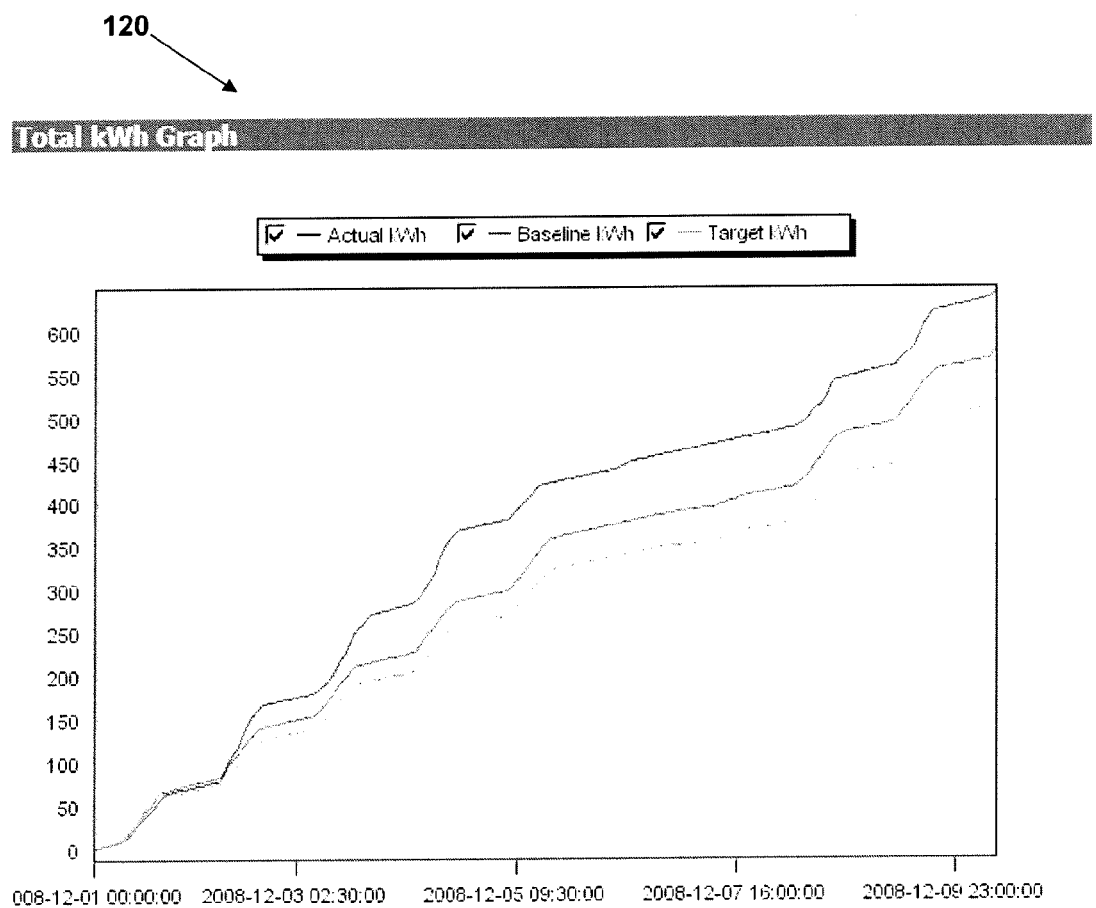
FIG. 11 shows a graphical representation of selected energy consumption date.

FIG. 11 shows a graph of total consumption. The graph is selected by selecting the button 112 in FIG. 10.

Figure 12:
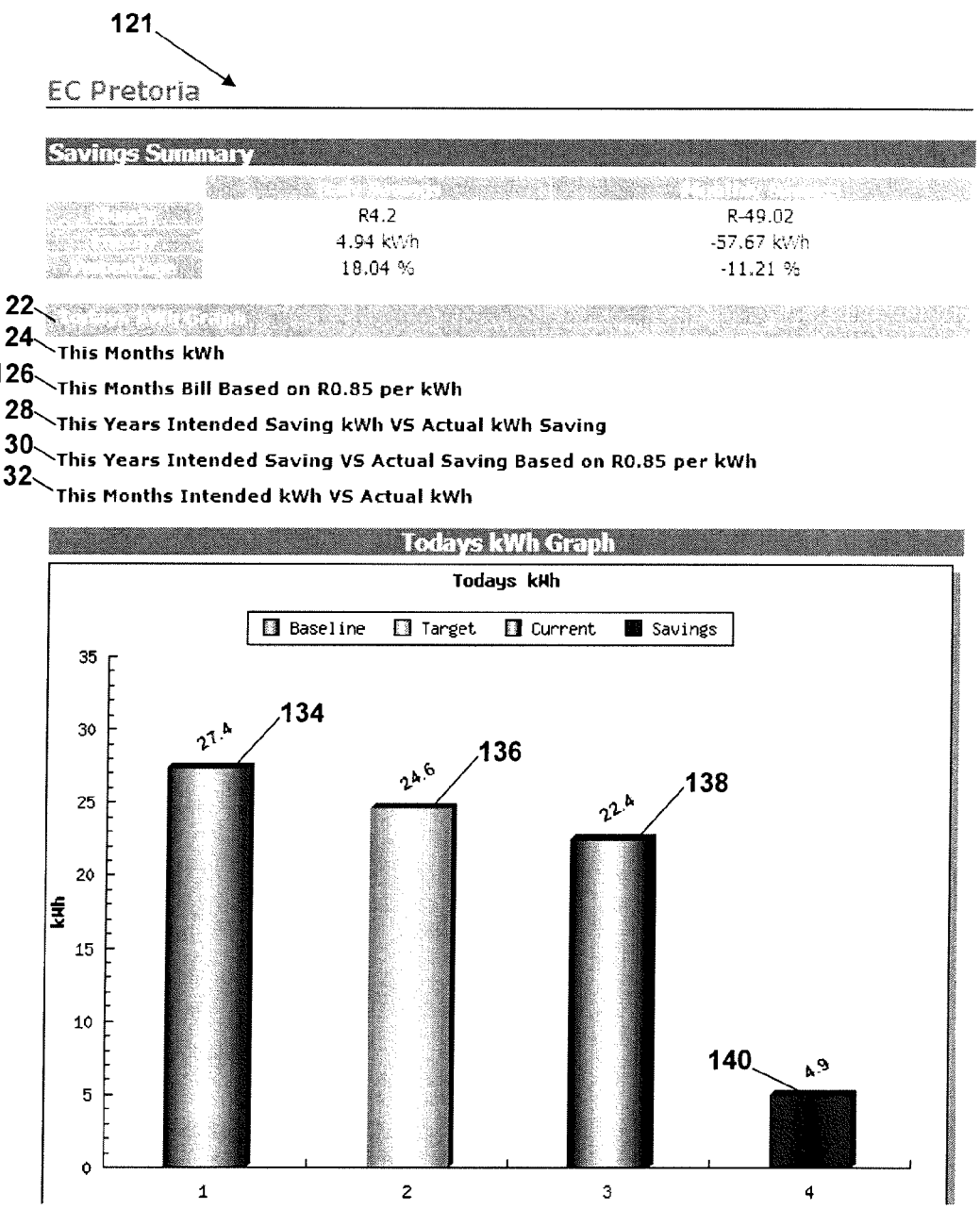
FIG. 12 shows a graphical representation of energy consumption savings data.

If the savings button 38 is selected on the screen 30 in FIG. 3, a summary of savings for a particular consumption site is displayed in a savings summary screen 120 (see FIG. 12). Various graphs can be selected such as a day's consumption 122, a present month's consumption 124, a present month's account 126, a present year's intended saving versus a present year's actual saving 128, a present year's intended saving in monetary terms versus an actual saving in monetary terms 130, and a present month's intended consumption saving versus the actual saving 132. One example, a particular day's consumption is shown in FIG. 12, indicating a baseline saving 134, a target saving 136, a current saving 138, and a savings 140. The savings 140 shows the relative size of the saving against the baseline, the target and the current consumption for the period in question.

If the billing information button 40 is selected on the screen in FIG. 3, a screen 142 (see FIG. 13) indicating a summary of a selected account can be shown. For example, a period start date can be selected at 144, a period end date can be selected at 146. Particular consumption sites can be selected at 148, 150, 152. The bill is set out in the format of a normal energy consumption bill. By selecting the button 154, the form can be exported to a so-called portable document format (PDF).

Figure 14:
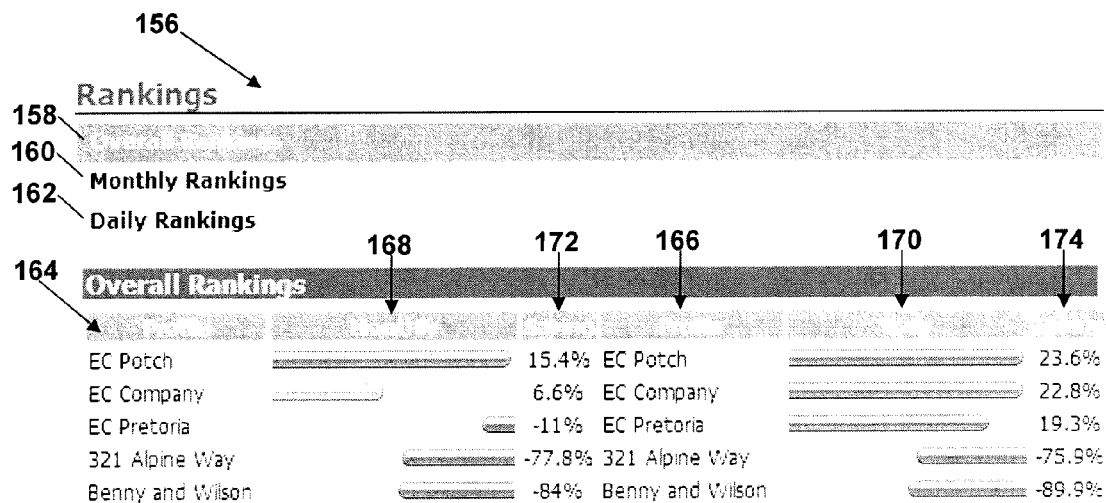
FIG. 14 shows energy consumption savings ranking data.

If the rankings information button 42 is selected on the screen in FIG. 3, a screen 156 (see FIG. 14) indicating savings rankings amongst a number of consumption sites is shown. Three options are available to display overall rankings 158, monthly rankings 160 and daily rankings 162. The consumption sites are listed in columns 164, 166, a colour coded bar graph of their monthly and daily savings 168, 170 and a saving percentage 172, 174.

Figure 15:
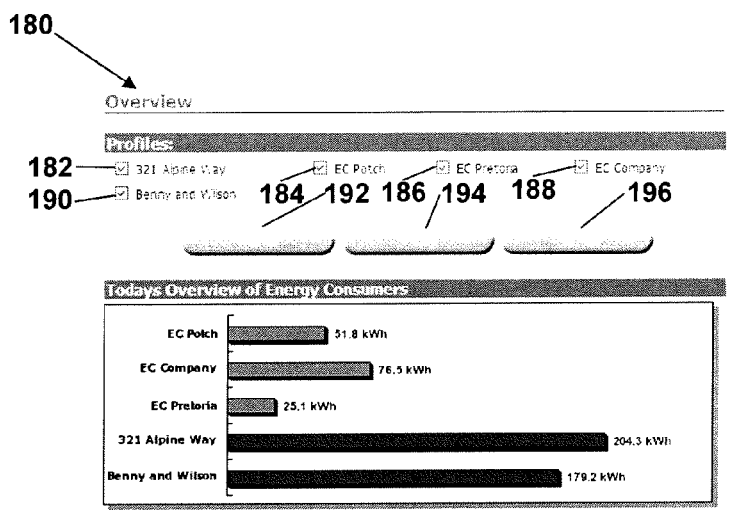
FIG. 15 shows summarized energy consumption data.

In FIG. 15 an overview 180 of a number of energy consumer sites is shown. The sites are selected by marking a number of tick boxes 182, 184, 186, 188 and 190. The overview 180 is in the form of a bar graph, but can be in the form of a pie chart, or the like. Furthermore, the overview can be shown for a month, a day or for a particular instant by selecting the buttons 192, 194, 196 respectively.

Figure 16:
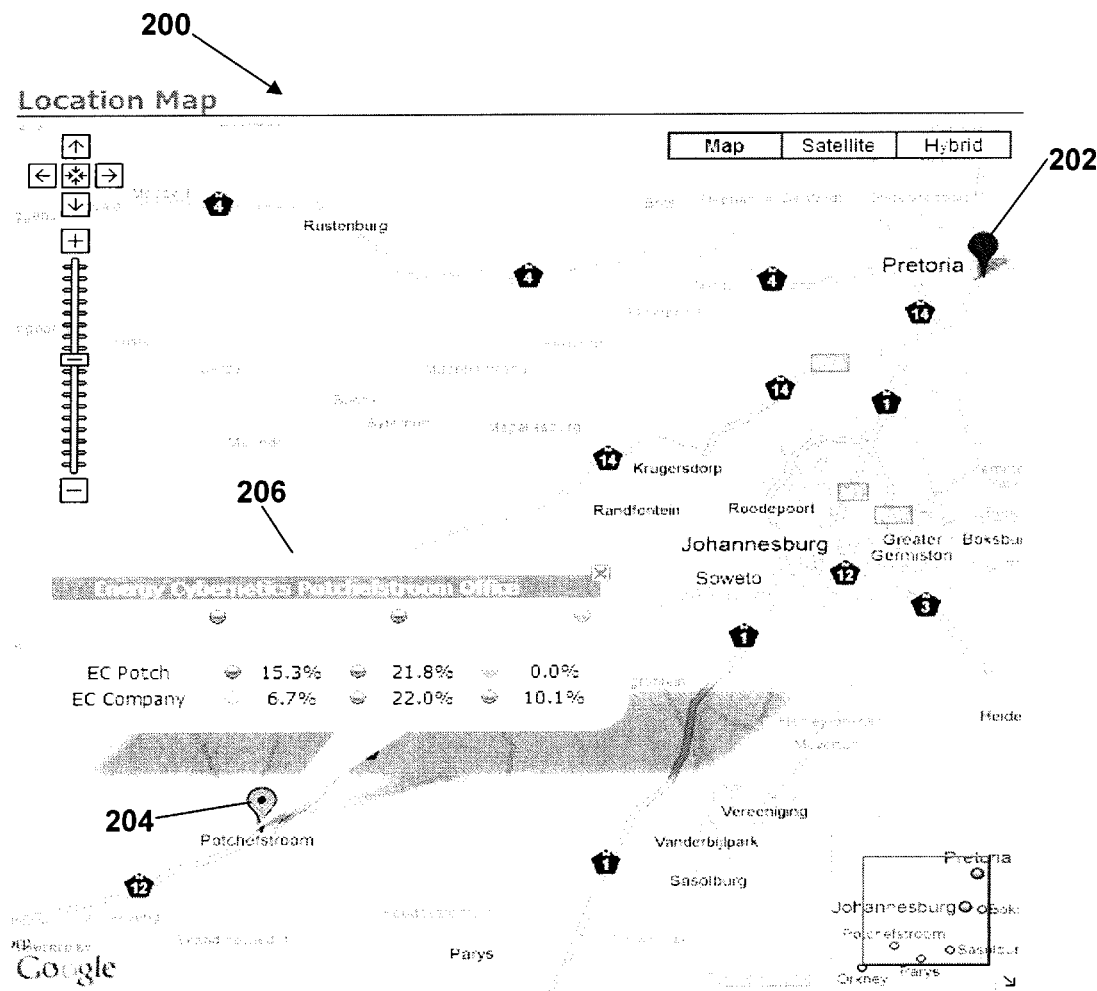
FIG. 16 shows energy consumption data on a map.

In FIG. 16, a map 200 is shown with icons 202, 204 indicating specific locations of energy consumption sites. The icons provide a graphical user interface of which the colour of the computer icon is representative of energy consumption data. For example, a red icon can be representative of an energy budget that is being exceeded and a green icon can be representative of an energy budget that is being met. As can be seen, when a particular icon is selected, for example by clicking on it with a mouse, a balloon 206 originating from the icon 204 provides more detail of the energy consumption site.

Figure 17:
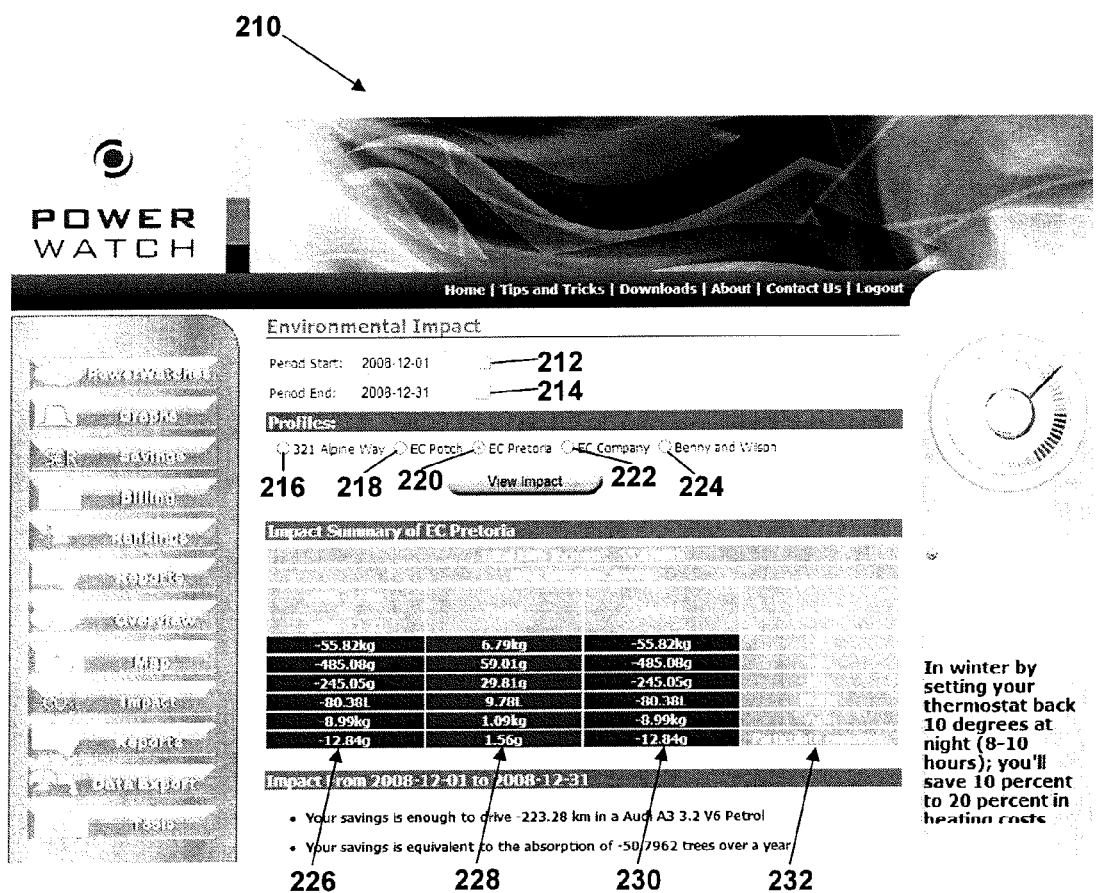
FIG. 17 shows an environmental impact of consumption table.

If the impact button 50 is selected on the screen in FIG. 3, a screen 210 (see FIG. 17) indicating the environmental impact for a particular period selected by fields 212 and 214 is displayed. The environmental impact can be selected for a number of consumption sites by selecting a button 216, 218, 220, 222, 224 referring to the site. A first column 226, indicates the total impact for the period, column 228 indicates the impact for a particular day, and column 230 indicates the impact for a particular month. Column 232 provides a definition of the particular type of environmental impact in terms of $CO_2$ generated, $SO_X$ generated, $NO_X$ emissions, water usage, ash generation and particulate emissions.

Figure 18:
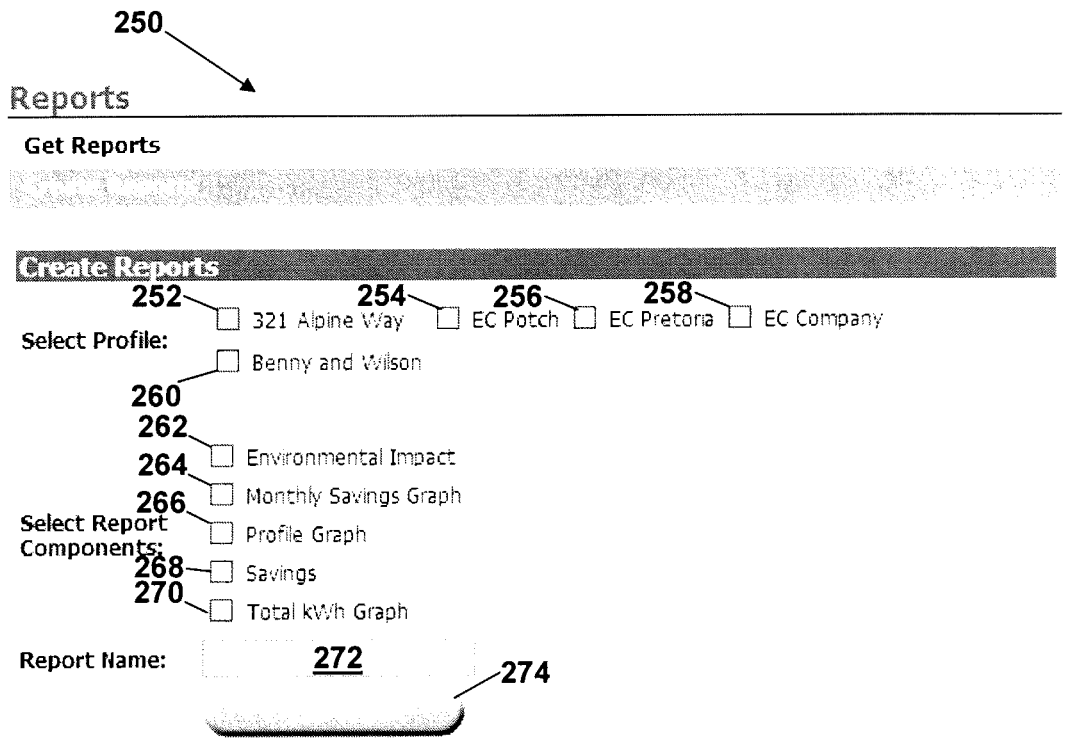
FIG. 18 shows a report generation interface screen.

If the reports button 52 is selected on the screen in FIG. 3, a report screen 250 (see FIG. 18) is displayed. On the report screen 250 various energy consumption sites can be selected by selecting one of the tick boxes 252, 254, 256, 258, 260. A particular type of report can be selected from a number of reports that can possibly be generated. The type of report is selected by selecting a particular tick box from a number of tick boxes. By selecting tick box 262 an Environmental Impact report can be generated, by selecting tick box 264, a Monthly Savings Graph can be generated, by selecting tick box 266 a Profile Graph can be generated, by selecting tick box 268 a Savings Graph can be generated, and by selecting tick box 270 a Total consumption (in kWh) Graph can be generated. The report can be given a name by typing the name into the data field 272 and can then be generated by pressing the button 274.

Figure 19:
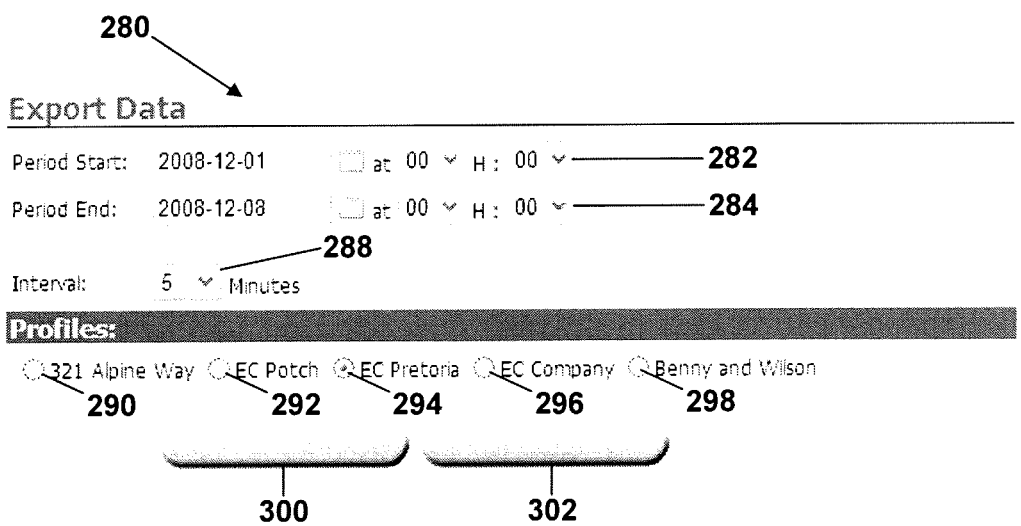
FIG. 19 shows a data export interface screen.

If the data export button 54 is selected on the screen in FIG. 3, a data export screen 280 (see FIG. 19) is displayed. The date and time range of the data export can be selected by filling in the details on the period start fields 284 and period end fields 286. Filling in a time interval in the data field 288, can choose the data interval for which the data is to be exported. On the data export screen 280 various energy consumption sites can be selected by selecting one of the tick boxes 290, 292, 294, 296, 298. Then the type of file that is generated can be selected by selecting button 300 to export data to a comma separated values (CSV) file or by selecting button 302 to export a CSV file to a compressed data file (known as a Zip file).

If the tools button 56 is selected on the screen in FIG. 3, five types of tools can be selected namely a Power Conservation Programme screen 310, a location tree screen 350, a Page View Count screen 400, a Portal Login Count screen 450 and a screen 500 providing energy consumption saving information.

In FIG. 20 the Power Conservation Programme screen 310 provides two buttons 312, 314 for selecting savings to be suggested on the monetary value of an account or for savings to be suggested on a total amount of energy consumed. The savings amount is entered in data field 316 and the sector of the industry is selected by selection an option in a tick box selected from 318 for mining, 320 for agriculture, 322 for industry, 324 for commercial, 326 for residential, 328 for government institutions. The total load is selected as either below 10 MVA by selecting tick box 330, or as above 10 MVA by selecting tick box 332. The cost of energy is entered in the data field 334 and the projected use is entered in 336. The tool then generates an estimate of the penalties or, alternatively, the saving that may apply under the conditions specified. This tool is essentially a "financial viability" tool—it gives a prospective user an indication of the savings he/she can expect to realise or, alternatively, of the financial impact of any impending new tariff or penalty structure.

Figure 21:
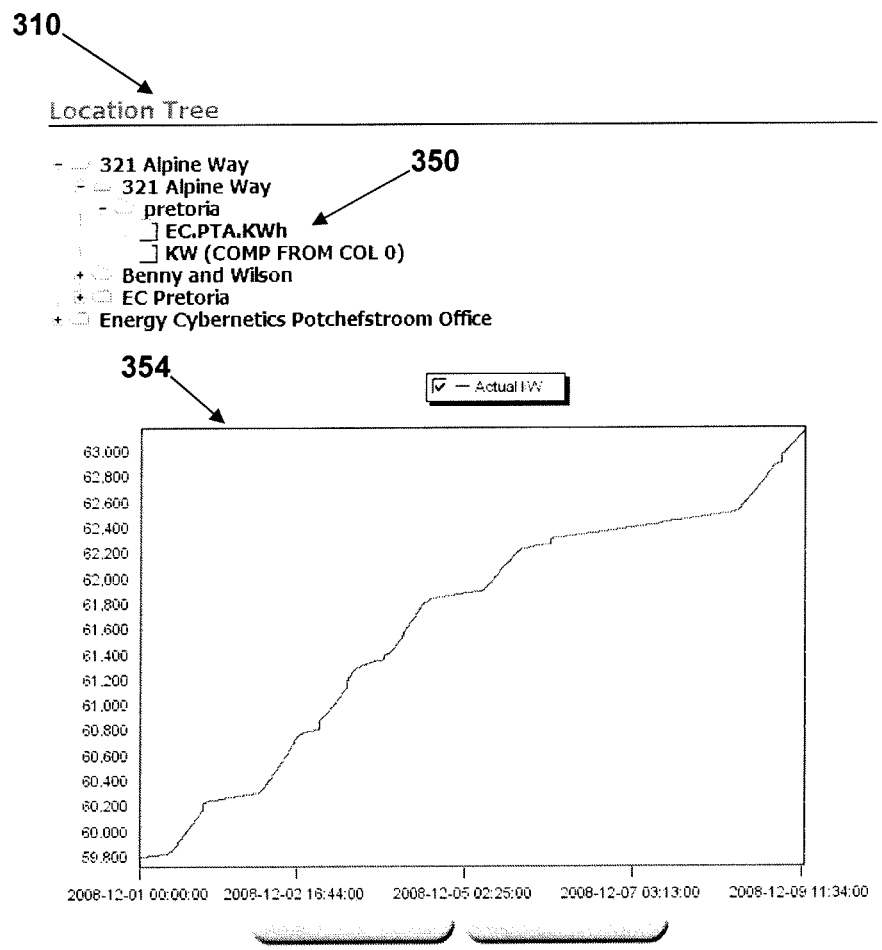
FIG. 21 shows a consumption composition tree.

In FIG. 21 a so-called location tree is shown which comprises the various energy consumption sites and their composition in a tree structure. If a consumption site is then selected a graph 354 of the actual power consumption is then shown.

In FIG. 22 a matrix 400 shows a description of website pages visited 402, the total number of times that the page has been visited 404, the number of times that the page has been visited in a single month 406, and the number of times that the page has been visited in a single day 408.

Figure 23:
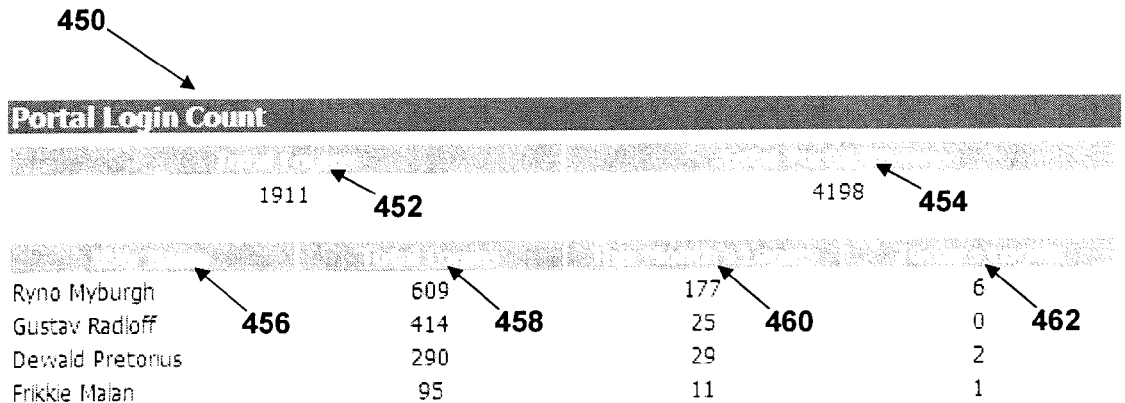

In FIG. 23 a matrix 450 shows a description of persons that logged into the website. The total number of logins are shown in data field 452 and the total number that the website has been visited are shown in data field 454. A list of users is shown in 456, the number of times that the user logged in is shown in 458, the number of times that the user logged in for a present month is shown in 460 and the number of times that a user logged in for a particular day is shown in 462.

Figure 24:
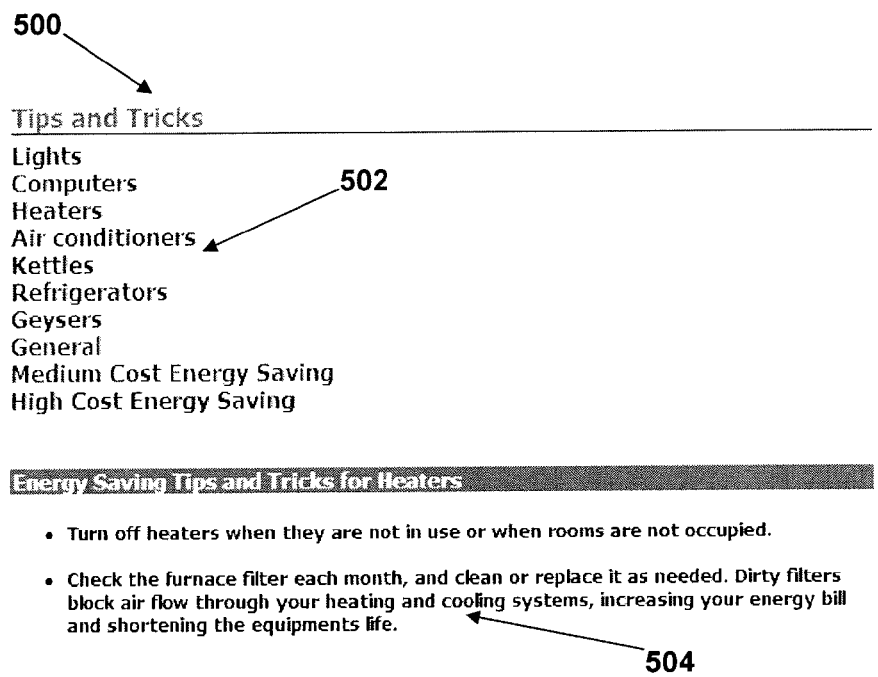
FIG. 24 shows an energy saving advice index.

In FIG. 24 a screen 500 displays a menu 502 of a number of energy consumption saving suggestions are provided with the details of each menu item displayed in a screen portion 504, when the item is selected.

The Inventor is of the opinion that the energy consumption display arrangement and the method of monitoring energy consumption provides a new and novel facility to monitor and to manage energy consumption.

This arrangement has the following advantages over existing technologies.

Energy consumption is made visible and understandable to a wider audience since current consumption is viewed against the perspective of a historical baseline as well as a target. Knowing that you are consuming 75 kw is a LOT less useful to the average person than knowing that he/she is consuming more than he/she should be—i.e. that your consumption is above target or above the baseline.

This information is presented to the user in near real-time—i.e. the user knows that his/her consumption is not on target when it happens. This gives the user time to react and change his/her behaviour in time to influence the daily or monthly consumption. Traditional systems (including your electricity bill) informs you that you were outside your target consumption after the event—when there is nothing you can do about it.

The system is designed to notify users when consumption falls outside of acceptable levels i.e. to "push" the information to you—traditional systems rely on users interrogating the system to find out what their consumption levels are like.

The system develops and maintains a baseline (a point of reference) that helps users make sense of their energy consumption.

The intuitive method of displaying information (using colour coding) and a dial simplifies the interpretation of the data—traditional systems are designed for technical people who have the skills to interpret charts and figures. The system described here simplifies everything associated with "reading a meter" and generates states that are easy to understand and requires no technical knowledge for people to take the right action.

The invention claimed is:

1. An energy consumption display arrangement, comprising:
   a database in which is stored incident energy consumption data of a number of energy consumption sites stored over a period of time; and
   a processor, configured to generate:
      a graphical user interface operable to retrieve selected consumption data of at least one energy consumption site from the database and to present said selected consumption data to a user, the graphical user interface having a user definable dashboard in the form of a composite dial for displaying simultaneously the incident power consumption, accumulated daily power consumption and accumulated monthly power consumption of the at least one energy consumption site, and wherein the composite dial provides pop-up display zones on each of the display scales, the pop-up display zones operable to display detailed historic power consumption graphs for each of the respective display scales, the historic power consumption graphs selected from an energy demand profile for a day, accumulated power consumption for a day, an energy demand profile for a present month and accumulated power consumption for a month; and
      display buttons operable to display for at least one energy consumption site any one or more of consumption graphs, consumption savings graphs, billing information, consumption savings rankings, detailed reports, consumption overview graphs, a map display of consumption, an environmental impact of consumption, a consumption data export menu, a power conservation program calculation pare, a consumption composition tree, and a database statistics/administration page, in which a map display of the consumption button displays consumption icons arranged on a map, the consumption icons further displaying colors representative of predefined consumption zones in real time.

2. An energy consumption display arrangement as claimed in claim 1, in which the detailed reports button is operable to display for a selected consumption site any one of a number of reports selected from an environmental impact report, a monthly savings graph, a profile graph a savings graph and a total consumption graph.

* * * * *